United States Patent [19]

Sale et al.

[11] 3,947,261

[45] Mar. 30, 1976

[54] PRODUCTION OF AMMONIUM POLYPHOSPHATE SOLUTIONS

[75] Inventors: Ernest W. Sale; Thomas A. Edwards; John W. Hodges, all of Lakeland, Fla.

[73] Assignee: Agrico Chemical Company, Tulsa, Okla.

[22] Filed: Jan. 4, 1974

[21] Appl. No.: 430,694

[52] U.S. Cl. .................................... 71/34; 71/29
[51] Int. Cl.² .......................................... C05B 7/00
[58] Field of Search ............... 71/32, 33, 34, 41, 42, 71/43, 51, 57, 29; 23/259.1, 252 R; 106/14; 423/305, 314, 315

[56] References Cited
UNITED STATES PATENTS

| | | | |
|---|---|---|---|
| 3,301,657 | 1/1967 | Dee et al. | 71/41 X |
| 3,342,579 | 9/1967 | Frazier | 71/41 X |
| 3,464,808 | 9/1969 | Kearns | 71/43 X |
| 3,503,706 | 3/1970 | Legal, Jr. | 71/43 X |
| 3,544,299 | 12/1970 | Fitz-William et al. | 71/43 X |
| 3,723,074 | 3/1973 | Sears et al. | 71/34 X |
| 3,723,086 | 3/1973 | Poynor et al. | 71/29 |

Primary Examiner—Frank A. Spear, Jr.
Assistant Examiner—Ferris H. Lander
Attorney, Agent, or Firm—Richards, Harris & Medlock

[57] ABSTRACT

Ammonium polyphosphate is produced in a pipe reactor by injecting a stream of ammonia countercurrent to superphosphoric acid passed axially through the reaction zone to cause vigorous backmixing of the two reactants and yield a melt of ammonium polyphosphate, and cooling the sidewalls of the pipe reactor sufficiently to form a layer of ammonium polyphosphate melt thereon to prevent formation of insoluble scale on the interior of the reactor. The resulting ammonium polyphosphate melt is then dissolved in recycled aqueous ammonium polyphosphate product solution and thereafter further diluted with water to form the product solution. In specific embodiments, minor but effective amounts of urea are added to the acid feed to diminish the tendency of insoluble scale from forming on the interior of the reaction zone, and to improve the stability and conversion of the product solution.

5 Claims, 3 Drawing Figures

PRODUCTION OF AMMONIUM POLYPHOSPHATE SOLUTIONS

This invention relates to liquid fertilizers. In another aspect, this invention relates to a process for producing stable aqueous ammonium polyphosphate base solutions. In still another aspect, this invention relates to improved method and apparatus for producing a high conversion ammonium polyphosphate melt and aqueous solutions thereof.

Liquid mixed fertilizers having compositions similar to those of standard dry mixed fertilizers are well known in the art. These fertilizers solutions possess advantages over dry mixed fertilizers, particularly since the cost of evaporating water from the solutions and bagging of the products is eliminated. Furthermore, the application of the fertilizer is generally simplified. In addition, the use of liquid fertilizers eliminates difficulties due to segregation and caking often encountered in the storing of dry fertilizers.

Wet process phosphoric acid is conventionally utilized in the production of both solid and liquid ammonium phosphate fertilizers. Wet process phosphoric acid is generally produced by the wet process method for producing phosphoric acid which includes the acidulation of phosphate rock with an inorganic acid, such as sulfuric acid. Generally, phosphate rock is ground and mixed with weak phosphoric acid to form a slurry and the slurry is introduced into a reactor wherein it is contacted with sulfuric acid. The slurry is filtered to yield a phosphoric acid solution containing 25–33% $P_2O_5$ along with soluble impurities which were originally in the rock, which include iron and aluminum. The phosphoric acid is then evaporated and concentrated to 50–54% $P_2O_5$, for example.

It is known to utilize this wet process phosphoric acid to manufacture both liquid and solid plant foods by contact of the phosphoric acid and free ammonia in a pipe reactor. Such processes are exemplified by U.S. Pat. No. 2,902,342; U.S. Pat. No. 3,503,706; and U.S. Pat. No. 3,482,945.

It has been found however, that impurities such as dissolved iron and aluminum will form unwanted precipitates within resulting aqueous solutions containing inorganic water soluble fertilizers prepared by neutralizing the wet process phosphoric acid with an alkaline reactant, such as ammonia or ammonium hydroxide or potassium hydroxide, or the like. More specifically, the impurities such as iron and aluminum salts are insoluble in near neutral solutions and precipitate as finely divided gelatinous masses, and because of the physical nature of the precipitate, filtering thereof is almost impossible.

Because of the precipitate-forming problems caused by impurities within wet process phosphoric acid, attempts have been made to produce liquid ammonium phosphate fertilizer solutions containing a high portion of polyphosphate. Polyphosphates basically are phosphates in a non-ortho form and they are more soluble than orthophosphate to thereby allow production of more concentrated liquid. Moreover, the polyphosphates have the ability to sequester or solubilize some of the common impurities which are retained in the liquid fertilizers produced from wet process phosphoric acid feed and thereby obviate some of the precipitation problems.

Thus, in an attempt to increase the percentage of polyphosphates in liquid fertilizers, and to diminish the precipitation problems described above, superphosphoric acid having a high percentage of phosphate in the non-ortho form has been utilized as feed to pipe reactors. Superphosphoric acid is made by further evaporation of a merchant grade wet process phosphoric acid to obtain a $P_2O_5$ content of from about 56 up to about 80% $P_2O_5$. U.S. Pat. No. 3,464,808 discloses that ammonium phosphate aqueous solutions can be made from a melt produced with superphosphoric acid and ammonia in a pipe reactor.

Notwithstanding the fact that ammonium phosphate melt obtained from pipe reactors has been utilized to produce liquid fertilizer base solutions containing about 10–11% N and 34–37% $P_2O_5$, serious problems have been encountered thereby. It is found that the reaction between ammonia and superphosphoric acid in a pipe reactor is quite exothermic, and the elevated temperatures in the pipe reaction zone tend to cause the ammonium polyphosphate to revert into orthophosphate and other phosphates. Furthermore, it has been found that such pipe reactors plug when continuous operation is attempted. In essence, material will solidify within the pipe and prevent fluid flow therethrough. For example, it has been found that an insoluble compound $FeNH_4P_2O_7$ is formed on the interior of the pipe reactors. This material cannot be dissolved, or effectively removed mechanically from the pipe reactor. Furthermore, a uniform quality high conversion product (a high weight percent of polyphosphate), has been difficult to obtain by reaction of superphosphoric acid and ammonia in a pipe reactor.

According to one embodiment of this invention, high conversion (high weight percent polyphosphate) ammonium polyphosphate is produced in a tubular reaction zone by a process which includes passing superphosphoric acid axially through a tubular reaction zone and contacting the superphosphoric acid with ammonia directed countercurrent thereto to cause turbulent backmixing thereof to form a melt of ammonium polyphosphate which is passed to the outlet of the tubular reactor, while maintaining the walls of the tubular reaction zone at a temperature sufficient to solidify a layer of ammonium polyphosphate thereon to thereby inhibit formation of insoluble scale thereon.

According to a preferred embodiment of this invention, the process set forth in said one embodiment is carried out such that the tubular reaction zone is maintained substantially filled with ammonium phosphate melt which is passed from the inlet to the outlet thereof continuously in the process.

According to another embodiment of this invention, a minor but effective amount of urea is introduced with the superphosphoric acid feed which will not only increase the conversion of the product but improve stability of the aqueous solution made from the product melt.

According to another embodiment of this invention, an aqueous solution of ammonium phosphate is produced wherein the ammonium phosphate melt from the tubular reaction zone produced in accordance with said one embodiment is initially dissolved in recycled product aqueous ammonium phosphate solution, which contains for example, about 10 to 11% by weight N and about 34–37 weight percent $P_2O_5$. Thereafter, the resulting solution is passed to a solution tank wherein further amounts of water are added thereto to produce the final product solution. The final product solution is cooled to a temperature below about 140°F.

According to a further embodiment of this invention, a novel apparatus is provided for carrying out the above-described embodiments.

According to still a further embodiment of this invention, insoluble scale formation is inhibited in a non-cooled tubular reaction zone wherein superphosphoric acid is reacted with ammonia by the introduction of from about 3 to about 6 weight percent urea based upon the superphosphoric acid.

This invention can be more easily understood from a study of the drawings in which.

Figure 1:
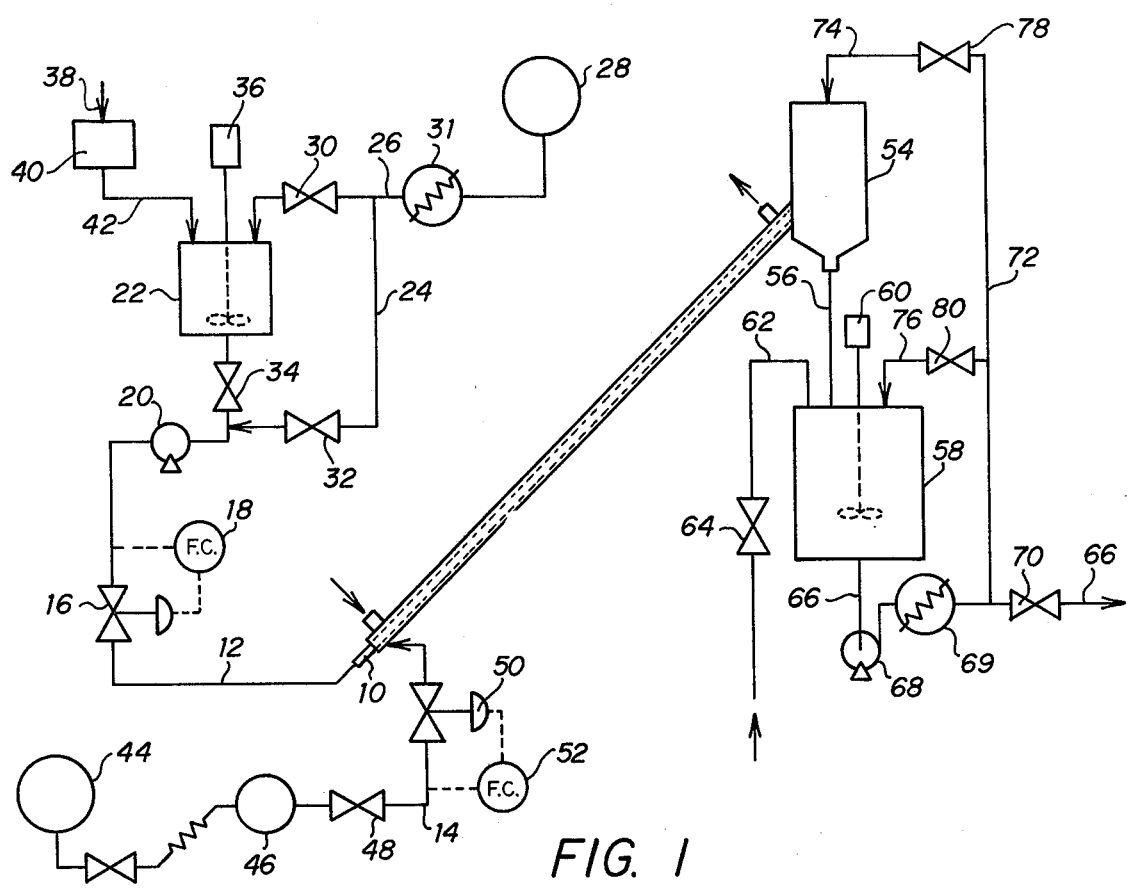
FIG. 1 is a schematic flow diagram illustrating one embodiment of the novel process of the subject invention.

Now referring to the drawings, and in particular to FIG. 1, a process is illustrated which can be utilized in accordance with a preferred embodiment of the subject invention. As illustrated, this process can be utilized to make base fertilizer aqueous solution having an N, $P_2O_5$, and $K_2O$ content (wt. %) of for example, 10-3-4-0, or 11-37-0. Each of these solutions will have a polyphosphate conversion in excess of 50 weight percent of the total phosphate therein, and preferably in excess of 80 weight percent thereof.

As shown, tubular reactor 10 receives superphosphoric acid via conduit 12 and ammonia via conduit 14. Conduit 12 has flow control valve 16 operatively positioned therein which is in turn operated by flow rate controller 18. Fluid is passed through valve 16 via pump 20. Conduit 12 receives superphosphoric acid either directly from mixing tank 22 or conduit 24. Both mixing tank 22 and conduit 24 are operatively connected with conduit 26. Conduit 26 is connected to a phosphoric acid source 28 and has heat exchanger 31 operatively positioned therein. Valve 30 in conduit 26 and valve 32 in conduit 24 as well as valve 34 in conduit 12 control the flow of phosphoric acid from source 28 to conduit 12. Mix tank 22 contains a suitable stirrer or agitating mechanism 36 and is supplied with urea via conduit 38, feeder 40 and conduit 42.

Conduit 14 communicates between an inlet of tubular reactor 10 and ammonia source 44. Heat exchanger 46, constant pressure valve 48, and flow control valve 50 are operatively positioned within conduit 14. Flow control valve 50 is operated by flow rate controller 52.

As shown, tubular reactor 10 is positioned inclined to the horizontal, such that the inlet is positioned below the outlet end thereof, and is equipped with a water cooling jacket. The outlet end of tubular reactor 10 is operatively connected to the midportion of the scrubber 54. Details of tubular reactor 10 and scrubber 54 will be explained below in relation to FIGS. 2 and 3. Conduit 56 communicates between the upper region of solution tank 58 and the bottom of scrubber 54. Solution tank 58 is equipped with stirrer 60, which can be any suitable stirring mechanism known in the art. Conduit 62 having flow control valve 64 operatively positioned therein communicates from a water source to the upper region of solution tank 58. Outlet conduit 66 has solution pump 68, cooler 69, and valve 70 operatively positioned therein and communicates between the outlet of solution tank 58 and a suitable storage area. Recycle manifold conduit 72 communicates between outlet conduit 66 and conduits 74 and 76 which have flow control valves 78 and 80, respectively, positioned therein. Conduit 74 communicates from manifold recycle conduit 72 to the upper region of scrubber 54, and conduit 76 communicates from recycle manifold 72 to the upper region of solution tank 58.

Now referring to FIGS. 1–3, the preferred process of the subject invention will be described in detail. Superphosphoric acid generally having a $P_2O_5$ content of from about 56% to about 80 wt. % thereof and generally about 68–70 wt. %, and optionally a small amount of urea, is supplied to acid inlet port 82 of tubular reactor 10 such that the acid will flow axially through tubular reactor 10. It is noted that acid inlet port 82 can be positioned either axially with reactor 10 or can be positioned as a side port or ports on tubular reactor 10 as desired; however, it is generally preferred that acid inlet port 82 be positioned to introduce the superphosphoric acid axially into tubular reactor 10. The superphosphoric acid is initially passed from superphosphoric acid source 28 through conduit 26 and heat exchanger 31. Generally, heat exchanger 31 will heat the superphosphoric acid to a temperature within the range of from about 100°F to about 180°F. Next, with valves 30 and 34 closed and valve 32 open, the superphosphoric acid will be passed through conduit 24, and into conduit 12, pump 20, flow control valve 16 to acid inlet port 82 of tubular reactor 10.

In similar manner, ammonia is passed from liquid ammonia storage tank 44 through heat exchanger 46 and then passed through valves 48 and 50 via conduit 14 into ammonia inlet port 84 of tubular reactor 10. As shown, ammonia inlet port 84 is angled transversely of the tubular reactor 10 toward acid inlet port 82. This results in ammonia passing through the port countercurrently into the oncoming stream of superphosphoric acid and causes turbulent backmixing of the reactants within the inlet end of tubular reactor 10. This turbulent backmixing (mixing upstream of ammonia inlet port 84) assures a very thorough and intimate contact of the ammonia with the superphosphoric acid.

The superphosphoric acid generally enters the reactor from acid inlet port 82 at a temperature in the range of 100°F to 180°F and the ammonia enters ammonia inlet port 84 at a temperature in the range of from about 100°F to 250°F.

Generally, in carrying out the reaction, the vaporous ammonia is supplied in a mole ratio of ammonia to phosphoric acid of about 0.8 to about 1.6.

It is noted that ports 82 and 84 for delivering the acid and the ammonia, respectively, to the interior tubular reactor 10, do not include any sparger arrangement, baffle, or any other such protrusion within the interior of the tubular reactor 10. The significance of this arrangement will be pointed out in greater detail hereinbelow. Furthermore, as shown in FIGS. 1 and 3 tubular reactor 10 is enclosed by a cooling jacket 86. Cooling jacket 86 can be supplied with any suitable coolant, such as air, stream or water. The only requirement is that the coolant maintain the walls of tubular reactor 10 at a temperature sufficiently low to effect crystallization of a layer of ammonium polyphosphate melt around the interior of the reactor, e.g., below about 300°F.

Figure 3:
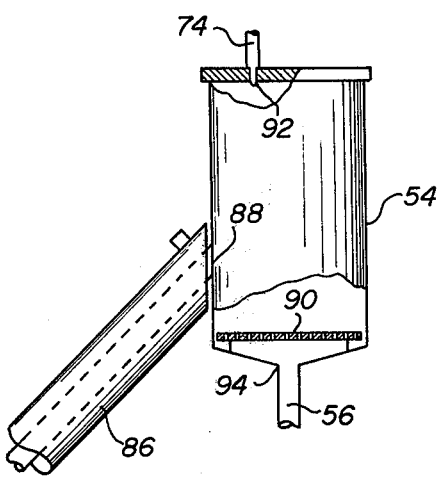
FIG. 3 is a partial sectional view of another detail of FIG. 1, showing the tubular reactor and the melt scrubber.

As noted in FIGS. 1 and 3, tubular reactor 10 is positioned transverse to the horizontal, such that the inlet thereof carrying ports 82 and 84 is lower than the outlet 88, which communicates to the interior of scrubber 54. The purpose of maintaining the tubular reactor zone 10 at an angle to the horizontal, is to assure that the molten ammonium polyphosphate melt substantially fills the interior of tubular reactor 10 as it passes therethrough. Thus, when tubular reactor 10 is positioned at an angle, the action of the force of gravity coupled with the proper inlet velocity of the reactants will assure that the ammonium polyphosphate melt will substantially fill the entire reactant zone and in essence, will move upwardly therethrough as a molten plug. This phenomena is hereinafter referred to as "plug flow". Thus, depending upon the length of the tubular reactor zone, it can be positioned at an angle from about 10° to substantially 90° to the horizontal, and preferably it is positioned at an angle of about 45° to the horizontal. Generally, the tubular reactor 10 has an L/D ratio in the range of from about 30:1 to 120:1 and preferably, is about 80:1. As used herein, the term "L/D ratio" means the ratio of the length to the mean cross sectional dimension of the reaction zone within tubular reactor 10. Preferably, tubular reactor 10 and therefore, the reaction zone is of a generally circular cross section and the L/D ratio is then the ratio of the length to the diameter of the reaction vessel.

The turbulent mixing of the ammonia and the superphosphoric acid results in an exothermic reaction between the ammonia and the superphosphoric acid to form ammonium polyphosphate melt. The reaction generally occurs at temperatures of between about 450°F and about 650°F. The cooling of the walls of tubular reactor 10 to below the freezing point of the ammonium polyphosphate melt results in a thin layer of the melt solidifying around the interior of the tubular reaction zone. The remaining mass of the molten ammonium polyphosphate moves through the tubular reaction zone as a plug, as described above. The thin layer of solidified ammonium polyphosphate melt is easily removed from the interior of the tubular reactor by dissolving and/or chipping. It is noted however, that it is not necessary to remove this scale in operation because the temperature in the interior of the reactor prevents it from building up beyond a certain constant thickness which can be controlled by the amount of cooling applied to the outside wall. This melt protects the interior of the reaction from the formation of an insoluble scale buildup of $FeNH_4P_2O_7$, which scale is insoluble and will very tightly adhere to the surface and is not removable by conventional means. Furthermore, the fact that the outlets of acid inlet port 82 and ammonia inlet port 84 are substantially flush with the sidewalls of tubular reaction zone 10, means that no metal surfaces are contained within the interior of tubular reaction zone 10 that are not cooled by the action of cooling jacket 86. It has been found that if any metal protrusion, such as a bubble cap or a sparger is contained within the interior of tubular reaction zone 10, then a solid deposit will form thereon and ultimately plug the reactor and yield it inoperable.

Now again referring to FIGS. 1 and 3, the ammonium polyphosphate melt is passed from outlet 88 of tubular reaction zone 10 into the interior of scrubber 54. The melt will pass from outlet 88 downwardly and be retained on perforated retaining plate 90. Furthermore, a spray of recycled aqueous ammonium polyphosphate solution is delivered from nozzle 92 and applied to the melt to dissolve the same. The recycled aqueous ammonium polyphosphate solution, is generally a product solution, for example, an 11–37–0 or a 10–34–0 fertilizer base solution which is obtained from solution tank 58, as will be hereinafter described in greater detail.

The concentrated aqueous ammonium polyphosphate solution which can contain small chunks of solid is then passed from outlet 94 of scrubber 54 through conduit 56 into solution tank 58. Simultaneously, water is passed to the interior of solution tank 58 via conduit 62 in sufficient quantities to dilute the concentrated solution of ammonium polyphosphate which is received from scrubber 54 and form a final base fertilizer solution of the desired concentration. Stirrer 60 is operated to uniformly admix the water with the concentrated solution. In addition, recycled product is passed into the upper region of solution tank 58 via conduit 76. Generally, the concentrated solution flows from the bottom of scrubber 54 at a temperature of about 140°–180°F into solution tank 58. The concentrated solution is admixed with water and recycled product and is maintained at a pH of about 5.9 to 6.2 and a specific gravity in the range of from about 1.0 to about 1.42 to make an 11–37–0 base solution, for example. The temperature in the tank is kept as low as possible to avoid polyphosphate reversion to orthophosphate. Generally, the solution is maintained at a temperature below 140°F.

The final product solution is removed from the bottom of solution tank 58 via conduit 66, pump 68, and cooler 69. Cooler 69 will cool the solution to a temperature in the range of from about 90° to about 100°F. It is noted also that the stream passing through conduit 66 is split such that one portion passes through manifold conduit 72 and then into conduits 74 and 76 for recycle to scrubber 54 and solution tank 58, respectively and the other portion passes into a storage unit. The action of valve 70 within conduit 66, valve 78 within conduit 74, and valve 80 within conduit 76 assures that the proper flow will pass through each of the conduits. Generally, it is preferred that about 10% to 20% of the stream, e.g., about 15.5 percent of the stream pass to the storage from conduit 66 and that 80% to 90% of the stream passes to manifold conduit 72, e.g., about 84.5 percent, wherein equal portions will thereafter pass through conduits 74 and 76 and be recycled, as described above.

Now again referring to FIG. 1, another embodiment of the subject invention will be described in detail. More specifically, as a modification of the process described above, the superphosphoric acid passing through conduit 26 is routed into mix tank 22 by closing valve 32 and opening valves 30 and 34. The phosphoric acid within mix tank 22 is contacted with urea supplied from conduit 42. Urea can be supplied to urea feeder 40 from conduit 38 and thereafter delivered to mix tank 22 via conduit 42 at a controlled rate from urea feeder 40. The urea is admixed with the superphosphoric acid within mix tank 22 by the action of stirrer 36. Generally, from about 2 to about 6 weight percent urea, based upon the superphosphoric acid is added thereto. Thereafter, the superphosphoric acid containing the minor but effective amount of urea is passed into tubular reactor 10 and reacted in the same manner as described above.

It has been specifically found that the addition of small amounts of urea, e.g., from 2 to about 3 wt. % urea to the superphosphoric acid results in a greater conversion to polyphosphate and a more stable product. It is not completely understood why the presence of a small amount of urea in the superphosphoric acid passing through the cooled reactor increases the conversion, but it is believed that the increased conversion is accomplished in part by an evolution of $CO_2$ which foams the melt and causes a reduced residence time in the reactor and therefore, the cooling applied to the reactor will have less effect on the temperature of the melt and thereby increase conversion.

Furthermore, it has been found that the addition of 3 and 4 wt. % urea will inhibit insoluble scale formation when the cooling jacket 86 is not utilized. More specifically, when the cooling jacket is not utilized and from 3 to 4 wt. % urea, e.g., about 3.5 wt. % is contained within the phosphoric acid, it has been found that the running time is increased to substantially threefold before plugging of the reactor takes place.

The following examples are given to better facilitate the understanding of this invention but are not intended to limit the scope thereof.

EXAMPLE 1

Figure 2:
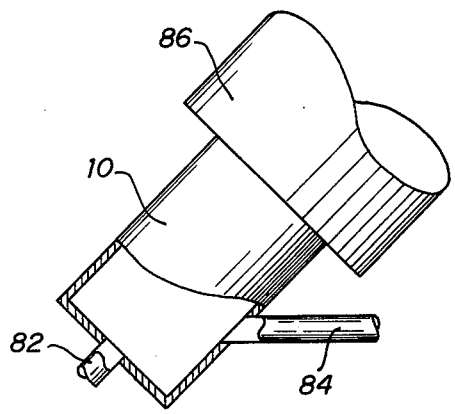
FIG. 2 is a partial sectional view of a detail of FIG. 1, showing the inlet end of the tubular reactor.

An ammonium polyphosphate solution having a 11–37–0 content (wt. % N, $P_2O_5$, and $K_2O$, respectively) was produced utilizing a system as illustrated in FIGS. 1–3. More specifically, the reactor pipe was 86 inches long and was positioned at 45° to the horizontal. The inlet end of the reactor pipe had a 5 inch extension which had acid and ammonia inlet ports 82 and 84, respectively, positioned as set forth in FIG. 2 of the drawing. The acid inlet port 82 was axial to the reactor pipe and the ammonia inlet port 84 was positioned at a 45° angle to the pipe so that it was directed toward the acid inlet port 82. The reactor pipe itself was 1¼ inch OD, 3/16 inch thick stainless steel pipe, and the middle 80 inches of the reactor pipe was enclosed by a 4 inch diameter water jacket. The inlet to the water jacket was positioned adjacent the inlet end of the reactor pipe with outlet water ports positioned at 28 inch, 38, and 72 inch centers therefrom toward the outlet end of the pipe. The outlet end of the reactor pipe operatively communicated to scrubber 54, as illustrated in FIGS. 1 and 3 of the drawing. The superphosphoric acid feed was passed through inlet conduit 26 and heated to a temperature of 180°F by heat exchanger 31. Valves in conduits 26 and 24 were adjusted so that acid was not passed through the mix tank 22, but passed directly to pump 20 and to acid inlet port 82. The analysis of the superphosphoric acid utilized is set forth in Table I below:

TABLE I

| ANALYSIS OF SUPERPHOSPHORIC ACID | |
|---|---|
| Component | Weight Percent |
| $P_2O_5$ | 69.11 |
| Conversion | 24.2 |
| $Fe_2O_3$ | 1.01 |
| $Al_2O_3$ | — |
| MgO | 0.32 |

TABLE I-continued

| ANALYSIS OF SUPERPHOSPHORIC ACID | |
|---|---|
| Component | Weight Percent |
| CaO | <0.001 |

The acid was passed through acid inlet port 82 at rates of 500 pounds per hour and 1000 pounds per hour while the ammonia was passed through inlet 84 at corresponding rates of 130 pounds per hour and 260 pounds per hour, respectively. The acid was preheated to 180°F and the ammonia to about 130°F. The reaction was operated under "plug flow" conditions. The runs were carried out with full cooling of the reactor with steam, full cooling with water exiting the jacket at 140°F and cooling of the first 30 inches of the reactor with 140°F exit water. Each separate run was made for a 6 hour duration. The run produced no plugging or insoluble scale formation. The results are set forth in Table II below:

TABLE II

| | Acid Feed | | Reactor Cooling | | Reactor Temp. | Melt Analysis | | | |
|---|---|---|---|---|---|---|---|---|---|
| Run No. | lbs/hr. | °F | Length (Inches) | Exit Water °F (1) | °F | pH | % N | % $P_2O_5$ | % Conv. |
| 1 | 500 | 180 | 80 | 140 | 499 | 2.2 | 12.0 | 62.3 | 70.1 |
| 2 | 500 | 180 | 30 | 140 | 515 | 2.4 | 11.5 | 62.6 | 75.2 |
| 3 | 1000 | 180 | 80 | 140 | 538 | 2.7 | 11.8 | 62.0 | 76.2 |
| 4 | 1000 | 180 | 30 | 140 | 557 | 2.8 | 11.4 | 63.4 | 80.0 |
| 5 | 1000 | 180 | 80 | Steam-230 | 562 | 2.7 | 11.4 | 63.8 | 81.6 |

(1) Temperature at Exit From Jacket

As a comparison, several test runs were carried out with superphosphoric acid having a $P_2O_5$ content of 69.89 and a polyphosphate conversion of 26.32 in a non-cooled U-shaped pipe reactor which utilized a bubble cap to inject ammonia into a mixing tee wherein it mixed and reacted with phosphoric acid and was then passed through the U-shaped reactor. Acid was supplied at about 500 pounds per hour and ammonia supplied at about 130 pounds per hour. It was found that a continuous run was impossible and a shutdown of all the runs was forced by solids deposited in the mixing tee and around the ammonia exit area of the bubble cap. There was also scaling downstream from the tee. Solids in the tee were in the form of nodules. Scale in the pipe section formed a coating of varying thickness covering the entire interior surface of the pipe. This coating was deposited in a pronounced taper, being thickest close to the tee and thinnest in the downleg section. Both the nodular and scale formations were steam insoluble. Several methods for cleaning the pipe of scale were tried without success. These methods including pounding with a hammer, boiling in HCl, boiling with NaOH solution, boiling in diluted superphosphoric acid, water dissolution, severe heating with direct fire, heating followed by quenching with water and various combinations of these methods. None of these treatments were particularly effective.

The above run was repeated except incorporating about 3 wt. % urea in the acid feed. Bubble cap plugging again resulted in shutdown, but about a threefold increase in running time was obtained. Plug formation in the rest of the tee was generally reduced. All the scale which was formed was the insoluble type. In this instance, even though the urea tended to inhibit the formation of insoluble scale and allow a longer running time, its presence did not increase the percent conversion to polyphosphate.

In contrast with these runs, the above example clearly indicates that backmixing in a smooth cooled pipe reaction which contains no internal protrusions provides conditions wherein sufficiently high conversion can occur, but yet insoluble scale will not form on the interior of the reactor. As shown in the above example, the cooling of the reactor surface to a temperature sufficient to solidify a layer of the melt effectively, coats the interior surface of the reactor with a thin layer of solidified melt and protects the pipe from formation of insoluble scale. The heat of the reaction in the interior of the reactor keeps the coating from becoming so thick that the reactor plugs. The melt coating is easily removable from the interior of the tube by conventional means, such as dissolution.

EXAMPLE 2

An apparatus such as shown in FIGS. 1–3 was utilized in the same manner as set forth in Example 1 above, with the exception that the mixing chamber as set forth in FIG. 2 was approximately 80% larger in diameter. Full cooling of the reactor 10 was maintained with cooling water. Feed rates of 450, 650, and 970 pounds per hour of superphosphoric acid having the analysis set forth in Table I, and maintained at 125°F were utilized. Corresponding ammonia feed rates for the above superphosphoric acid feed rates were 120, 170 and 260, pounds per hours, respectively. The reactor was operated under "plug flow" conditions. Controls, temperatures and analytical data are set forth in Table III below.

TABLE III

| Run No. | Acid Feed lbs/hr | °F | Reactor Cooling Length (Inches) | Exit Water °F (1) | Reactor Temp. °F | Melt Analysis pH | % N | % P₂O₅ | % Conv. |
|---|---|---|---|---|---|---|---|---|---|
| 1 | 450 | 125 | 80 | 160 | 448 | 3.3 | 12.4 | 61.5 | 62.2 |
| 2 | 650 | 127 | 80 | 160 | 481 | 2.9 | 12.1 | 61.9 | 64.7 |
| 3 | 970 | 122 | 80 | 160 | 541 | 3.1 | 11.9 | 62.1 | 67.2 |

(1) Temperatures at Exit From Jacket

Next, the test runs set forth above were repeated except the acid was passed through mixing tank 22 and 2 wt. % urea was added to the superphosphoric acid feed. The controls, temperatures, and analytical results are set forth in Table IV below:

TABLE IV

| Run No. | Acid Feed lbs/hr. | °F | %Urea | Reactor Cooling Length (Inches) | Exit Water °F (1) | Reactor Temp. °F | Melt Analysis pH | % N | % P₂O₅ | % Conv. |
|---|---|---|---|---|---|---|---|---|---|---|
| 1 | 450 | 127 | 2 | 80 | 161 | 477 | 2.8 | 11.9 | 62.1 | 72.9 |
| 2 | 650 | 125 | 2 | 80 | 175 | 498 | 2.5 | 12.2 | 63.2 | 73.6 |
| 3 | 970 | 124 | 2 | 80 | 183 | 526 | 2.8 | 11.9 | 63.6 | 75.3 |

(1) Temperature at Exit From Jacket

As can be seen, the use of urea resulted in an increase of conversion of from 8 to 10 percent above the same control runs without urea. Subsequent tests showed that 3% urea in the acid feed further increased conversion. Furthermore, some 33 samples of product base solution were retained and observed during storage. Out of the 27 samples made without urea, 22 contained solids after approximately 2 months of storage, whereas, of 7 samples made with 2-3 percent urea, only 3 contained solids after the same storage time.

Thereafter, it is clear that the addition of 2 to 3 percent urea to the acid inhibits the formation of solids in the 11-37-0 base solution.

EXAMPLE 3

Test runs were made to show the effect of utilizing a straight reactor, such as illustrated in FIGS. 1—3, but positioned in the horizontal plane. In essence, the same equipment was utilized as was utilized in the first 2 runs of Example 1, but the pipe reactor 10 was placed in the horizontal position. Superphosphoric acid was fed at 180°F and at 500 pounds per hour and ammonia was fed at about 130°F and at 130 pounds per hour. The conversions in these test runs were from about 5 to 10% lower than the conversions in Example 1.

As seen from a comparison of the conversion obtained in a horizontal reactor as compared to the higher conversions obtained in Example 1, wherein the reactor was positioned at a 45° angle and a "plug flow" resulted, the maintenance of "plug flow" is essential to maintain a higher degree of conversion.

While this invention has been described in relation to its preferred embodiments, it will be understood that various modifications thereof will now be apparent to one skilled in the art upon reading this specification, and it is intended to cover such modifications as fall within the scope of the appended claims.

We claim:

1. A method of making ammonium polyphosphate comprising:
   a. introducing a stream of superphosphoric acid into a tubular reaction zone and passing said stream axially through said tubular reaction zone;
   b. passing a stream of ammonia countercurrent into said superphosphoric acid stream passing through said tubular reaction zone to cause turbulent mixing thereof and form a molten reaction product therebetween; and
   c. maintaining the walls of said tubular reaction zone cool enough to solidify a layer of molten reaction product in contact therewith 2. The method of claim 1 wherein said superphosphoric acid is introduced axially through said tubular reaction zone, and said ammonia is passed transversely into said tubular reaction zone countercurrent to the flow of said superphosphoric acid from a port extending through the sidewall of said zone.

3. The method of claim 1 wherein the walls of said tubular reaction zone are cooled to a temperature below about 300°F.

4. In a process of producing ammonium polyphosphate which includes passing superphosphoric acid axially through a tubular reactor zone while introducing ammonia into said superphosphoric acid which results in an exothermic reaction whereby an ammonium polyphosphate melt is formed, the improvement comprising:

cooling the walls of said tubular reaction zone sufficiently to solidify a layer of molten ammonium polyphosphate melt thereon.

5. The improved process of claim 4 wherein said walls are cooled to a temperature below about 300°F.

* * * * *